US006976778B2

(12) United States Patent
Kamijima

(10) Patent No.: US 6,976,778 B2
(45) Date of Patent: Dec. 20, 2005

(54) ROD INTEGRATOR, ILLUMINATOR, PROJECTOR, AND OPTICAL DEVICE

(75) Inventor: Shunji Kamijima, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/705,935

(22) Filed: Nov. 13, 2003

(65) Prior Publication Data

US 2004/0156212 A1 Aug. 12, 2004

(30) Foreign Application Priority Data

Nov. 25, 2002 (JP) ........................................ 2002-340881

(51) Int. Cl.$^7$ ............................ F21S 4/00; F21V 21/30; F21V 3/00; F21V 5/00
(52) U.S. Cl. ...................... 362/583; 362/551; 362/558; 362/581; 362/582
(58) Field of Search ........................ 362/318, 551–561, 362/556, 558, 581–583; 385/46; 359/742

(56) References Cited

U.S. PATENT DOCUMENTS

| | | | | |
|---|---|---|---|---|
| 659,353 A | * | 10/1900 | Pitkin .......................... 362/339 |
| 3,170,980 A | * | 2/1965 | Pritchard ..................... 385/133 |
| 3,622,231 A | * | 11/1971 | Hansen ........................ 359/720 |
| 3,913,872 A | * | 10/1975 | Weber .......................... 359/720 |
| 4,204,881 A | * | 5/1980 | McGrew ....................... 136/246 |
| 4,750,798 A | * | 6/1988 | Whitehead .................. 385/133 |
| 4,895,420 A | * | 1/1990 | Waymouth ................... 385/131 |
| 4,918,583 A | * | 4/1990 | Kudo et al. .................. 366/268 |
| 5,050,946 A | * | 9/1991 | Hathaway et al. ............ 385/33 |
| 5,303,084 A | * | 4/1994 | Pflibsen et al. .............. 359/503 |
| 5,303,322 A | * | 4/1994 | Winston et al. .............. 385/146 |
| 5,311,360 A | * | 5/1994 | Bloom et al. ................ 359/572 |
| 5,506,929 A | * | 4/1996 | Tai et al. ...................... 385/146 |
| 5,581,405 A | * | 12/1996 | Meyers et al. ............... 359/571 |
| 5,623,365 A | * | 4/1997 | Kuba ............................ 359/569 |
| 5,771,328 A | * | 6/1998 | Wortman et al. ............ 385/146 |
| 5,863,113 A | * | 1/1999 | Oe et al. ....................... 362/31 |
| 5,917,664 A | * | 6/1999 | O'Neill et al. ............... 359/831 |
| 5,999,685 A | * | 12/1999 | Goto et al. ................... 385/146 |
| 6,104,446 A | * | 8/2000 | Blankenbecler et al. ........ 349/5 |
| 6,104,453 A | * | 8/2000 | Watanabe ..................... 349/61 |
| 6,129,439 A | * | 10/2000 | Hou et al. ..................... 362/31 |
| 6,157,486 A | * | 12/2000 | Benson et al. ............... 359/498 |
| 6,205,271 B1 | * | 3/2001 | Bowron et al. ............... 385/31 |
| 6,272,269 B1 | * | 8/2001 | Naum .......................... 385/43 |
| 6,398,368 B2 | * | 6/2002 | Chen ............................ 353/98 |
| 6,419,365 B1 | * | 7/2002 | Potekev et al. .............. 353/98 |
| 6,454,438 B1 | * | 9/2002 | Wada ........................... 362/268 |
| 6,536,914 B2 | * | 3/2003 | Hoelen et al. ............... 362/231 |
| 6,575,580 B2 | * | 6/2003 | Okamori et al. ............ 353/98 |
| 6,591,022 B2 | * | 7/2003 | Dewald ....................... 382/274 |
| 6,642,969 B2 | * | 11/2003 | Tew ............................. 348/743 |
| 6,728,448 B2 | * | 4/2004 | Schmidt et al. .............. 385/46 |
| 6,795,243 B1 | * | 9/2004 | McGettigan et al. ........ 359/486 |
| 2001/0008470 A1 | * | 7/2001 | Dewald ........................ 359/850 |
| 2002/0005914 A1 | * | 1/2002 | Tew ............................. 348/743 |
| 2002/0008791 A1 | * | 1/2002 | Okamori et al. ............... 349/5 |
| 2002/0135856 A1 | * | 9/2002 | Penn ............................ 359/290 |
| 2002/0135862 A1 | * | 9/2002 | Dewald ........................ 359/298 |
| 2003/0020839 A1 | * | 1/2003 | Dewald ........................ 348/743 |
| 2003/0099108 A1 | * | 5/2003 | Slobodin ..................... 362/293 |
| 2003/0151836 A1 | * | 8/2003 | Davis ........................... 359/892 |
| 2003/0198050 A1 | * | 10/2003 | Yamazaki et al. ........... 362/268 |
| 2003/0223116 A1 | * | 12/2003 | Amm et al. .................. 359/572 |

FOREIGN PATENT DOCUMENTS

JP          08-227034    *   9/1996    ............ G02B/7/00

* cited by examiner

*Primary Examiner*—Stephen Husar
*Assistant Examiner*—Jason Han
(74) *Attorney, Agent, or Firm*—Oliff & Berridge, PLC

(57) ABSTRACT

The invention provides a rod integrator or the like having high efficiency for light utilization and suitable for a color-recapture system. The present invention can include a rod integrator having a reflective inner circumference (reflecting surface) for emitting light incident on an incident-end opening from a light source through an emerging-end opening. An end face on the outer periphery of the emerging-end opening can be a scattering surface for reflecting the incident light on the end face toward the optical axis that agrees with the central axis of the rod integrator.

8 Claims, 8 Drawing Sheets

ROD INTEGRATOR, ILLUMINATOR, PROJECTOR, AND OPTICAL DEVICE

BACKGROUND OF THE INVENTION

1. Field of Invention

The present invention relates to a rod integrator, an illuminator, a projector, and an optical device, and particularly, to a rod integrator suitable for a color-recapture system.

2. Description of Related Art

Various types of projectors have been proposed recently. For single-plate projectors, for example, a sequential color-recapture system (hereinafter, referred to as "a color-recapture system") has been proposed, such as that described in Sequential Color Recapture and Dynamic Filtering: A Method of Scrolling Color, D. Scott Dewald, Steven M. Penn, and Michael Davis, Texas Instruments Incorporated, (SID 00 DIGEST, 40.2/Dewald). A projector of a color-recapture system includes a light source that supplies white illumination light, a rod integrator for uniformizing the white light from the light source, and a color wheel disposed on an emerging end of the rod integrator for color separation. The rod integrator has an opening for letting the light from the light source in and a reflecting film around the opening, at an incident end face on the light source side. The color wheel has a combination of dichroic films in an appropriate form such as a spiral. The dichroic films transmit light in a specific wavelength range and reflect light in other wavelength ranges. For example, when white light is separated into light in three wavelength ranges, an R-light transmitting dichroic film, a G-light transmitting dichroic film, and a B-light transmitting dichroic film for transmitting only red (R) light, green (G) light, and blue (B) light, respectively, are formed. The color wheel rotates around an axis parallel to the optical axis.

Consider light emitted from the emerging end face of the rod integrator and irradiated to the R-light transmitting dichroic film of the color wheel. Among the white light from the light source, the R light passes through the R-light transmitting dichroic film of the color wheel. On the other hand, the G light and the B light are reflected by the R-light transmitting dichroic film of the color wheel to return toward the light source. The reflected G light and B light are incident on the rod integrator again from the emerging end face. The G light and the B light moving in the rod integrator toward the direction of the light source reach the incident end face. As described above, on the incident end face of the rod integrator, the reflecting film is formed around the opening. Therefore, among the G light and the B light that move in the rod integrator toward the direction of the light source, light incident on the reflecting film is reflected by the reflecting film. The G light and the B light reflected by the reflecting film move in the rod integrator toward the direction of the color wheel and exit from the emerging end face of the rod integrator. The G light and the B light emerging from the emerging end face pass through the G-light transmitting dichroic film or the B-light transmitting dichroic film of the rotating color wheel, without any change, when irradiated thereon. For light that can not pass therethrough, but is reflected by the color wheel, the above-described processes are repeated. Since the color wheel rotates continuously, some light component of the reflected light can pass through the color wheel.

The above description takes the light irradiated to the R-light transmitting dichroic film as an example. The above behavior of light applies also to light emerging from the color wheel and incident on the G-light transmitting dichroic film or the B-light transmitting dichroic film. Accordingly, light loss is reduced, so that light from the light source can be used effectively. This provides efficient color separation and bright color display.

SUMMARY OF THE INVENTION

Since the color wheel of the projector in the color-recapture system described above rotates, it is not possible to bring the color wheel into close contact with the emerging end face of the rod integrator. Therefore the color wheel and the rod integrator must be spaced from each other.

Among the light emerging from the outlet at the emerging end of the rod integrator, the light that is not transmitted but reflected by the color wheel is irradiated to the outer end face around the outlet of the emerging end of the rod integrator. The light irradiated to the end face cannot return into the rod integrator. This poses the problem of decreasing light-use efficiency.

Accordingly, in order to increase the light-use efficiency, the distance between the rod integrator and the color wheel is desirably decreased as much as possible. The small distance between the rod integrator and the color wheel makes it difficult for the light reflected by the color wheel to be irradiated to the end face, which may increase light-use efficiency. However, the color wheel rotates, thus causing side-runout. Therefore, the rod integrator and the color wheel must have a certain clearance therebetween. Accordingly, it is difficult to bring the color wheel into close contact with the rod integrator in view of assembling accuracy.

The present invention has been made in view of the above problems, and accordingly, an object of the invention is to provide a rod integrator and an illuminator having high light-use efficiency and suitable for a color-recapture system, and to provide a projector capable of projecting a high-contrast bright image with the bright illuminator having high light-use efficiency, and an optical device.

In order to solve the above problems and to achieve the objects, according to the present invention, a rod integrator can be provided that has a reflecting surface, for emitting light that is incident on an incident-end opening from a light source through an emerging-end opening. The end face of the outer periphery of the emerging-end opening can be a scattering surface or a blaze surface that reflects the incident light on the end face toward the central axis of the rod integrator. Accordingly, the use of a combination of the rod integrator and a color wheel allows the light reflected by the color wheel to be reflected by the scattering surface or the blaze surface toward the central axis. This can increase the light-use efficiency.

According to a preferred embodiment of the invention, the end face is preferably substantially perpendicular to the central axis. This can eliminate the necessity of the step of processing the shape of the end face itself. Consequently, the end face can be processed at a low cost by simply forming a reflecting film on the end face, thus increasing the light-use efficiency.

According to a preferred embodiment of the invention, preferably, the blaze surface of the end face has different blaze angles depending on the position of the blaze surface in the end face, the blaze angle being defined by the normal of the blaze surface and the central axis. The longer the distance between the blaze surface and the central axis is, the larger the blaze angle is. This allows the control of the number of reflections in the blaze surface. Consequently, the light-use efficiency can be increased by controlling the number of reflections, for example, to one.

According to a preferred embodiment of the invention, preferably, the reflectance of the end face is approximately 80 percent or more. This further increases the light-use efficiency.

According to a preferred embodiment of the invention, preferably, the scattering surface of the end face includes a plurality of V-grooves having a very small depth. This increases the light-use efficiency by controlling the direction of the scattering of the light.

According to a preferred embodiment of the invention, preferably, the end face further has a reflecting surface around the scattering surface. This further increases the light-use efficiency.

According to the invention, an illuminator can be provided that includes a light source for supplying light, and the rod integrator according described above, for substantially uniformizing the intensity distribution of the light from the light source. This provides bright illumination light having high light-use efficiency.

According to the invention, a projector can be provided that includes the above-described illuminator, a spatial light modulator for modulating incident light in accordance with an image signal, and a projector lens for projecting the modulated light. This provides a bright projected image with less stray light and high contrast.

According to the invention, an optical device having the above-described rod integrator can be provided. This allows efficient processing with bright illumination light.

BRIEF DESCRIPTION OF THE DRAWINGS

The invention will be described with reference to the accompanying drawings, wherein like numerals reference like elements, and wherein.

DETAILED DESCRIPTION OF PREFERRED EMBODIMENTS

Preferred embodiments of the present invention will be specifically described hereinafter with reference to the drawings.

Figure 1:
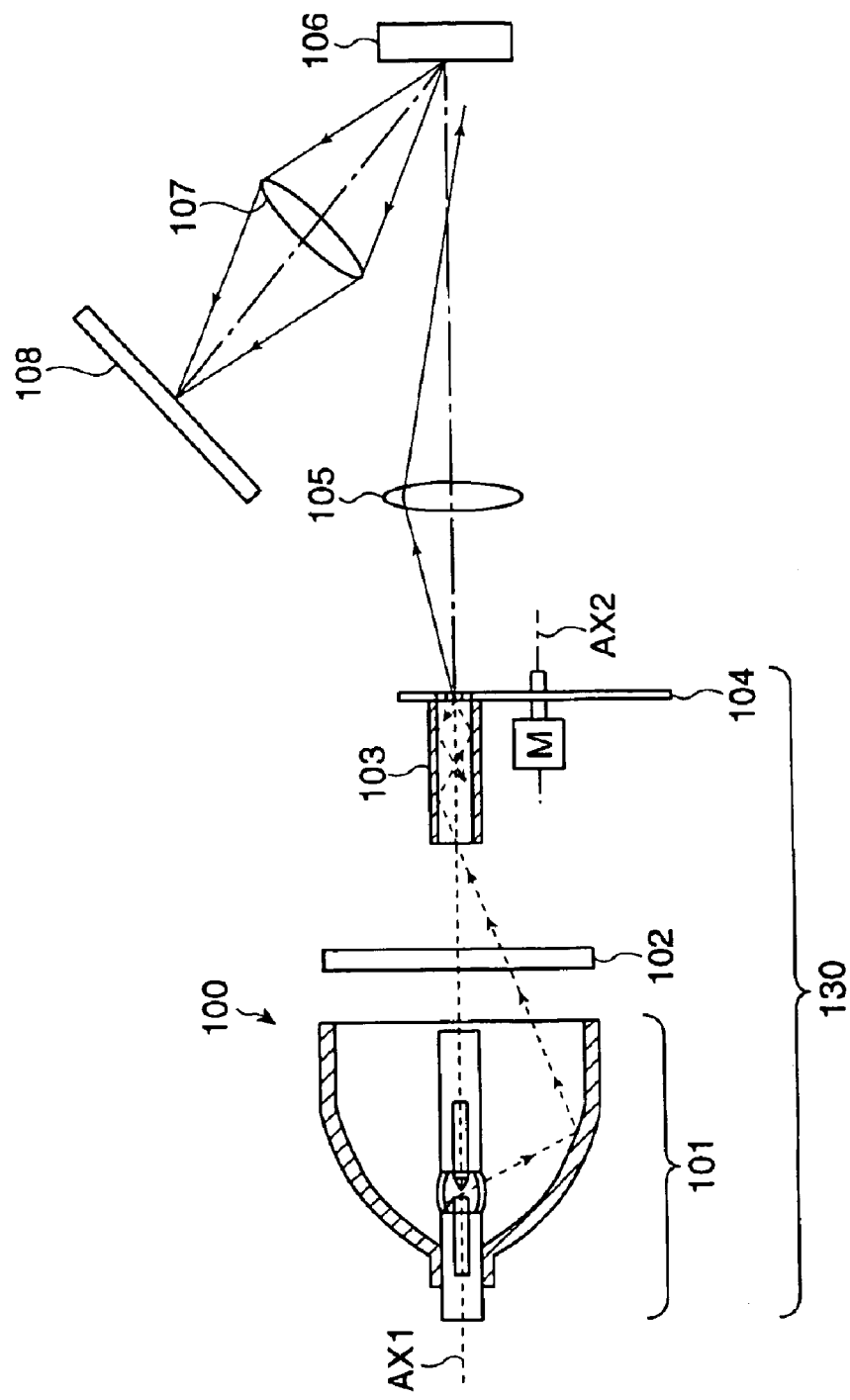
FIG. 1 is a schematic diagram of a projector according to a first embodiment of the present invention.

FIG. 1 shows a schematic structure of a projector according to a first embodiment of the present invention. Features of the embodiment can include the structure of a rod integrator 103, which will be described in greater detail below. The whole of the projector 100 will be described first. The projector 100 can be applied to any of projectors with a transmissive liquid-crystal light valve, conventional projectors with a tilt-mirror device, and projectors of a color-recapture system with a tilt-mirror device.

A light source 101 supplies white light. The white light from the light source 101 passes through a front glass 102. The front glass 102 is coated with an infrared (IR) coat and an ultraviolet (UV) coat. The light that has passed through the front glass 102 is incident on one end face of the rod integrator 103 for uniformizing the illumination. The light moving in the rod integrator 103 by multiple reflections emerges from the other end face. The light source 101, the front glass 102, and the rod integrator 103 construct an illuminator 130.

The light that has emerged from the rod integrator 103 is incident on a color wheel 104 for color-separating the light from the light source 101. The color wheel 104 has a combination of dichroic films in an appropriate shape, such as a spiral. The dichroic films transmit light in a specific wavelength range and reflect light in other wavelength ranges.

For example, when white light is color-separated into light in three wavelength ranges, an R-light transmitting dichroic film, a G-light transmitting dichroic film, and a B-light transmitting dichroic film for transmitting only red (R) light, green (G) light, and blue (B) light, respectively, are formed. A motor M rotates the color wheel 104 around an axis AX2 parallel to an optical axis AX1.

The light color-separated by the color wheel 104 is incident on a reflective spatial light modulator 106 through a relay lens 105. The reflective spatial light modulator 106 is a light modulator using a tilt mirror device. The reflective spatial light modulator 106 modulates incident light for emission in accordance with an image signal. The modulated light is reflected through a projector lens 107 toward a screen 108. The projector lens 107 projects an image formed in the reflective spatial light modulator 106, in an enlarged scale, on the screen 108. One example of the tilt mirror device is a digital mirror device (DMD) of Texas Instruments Incorporated.

Figure 2:
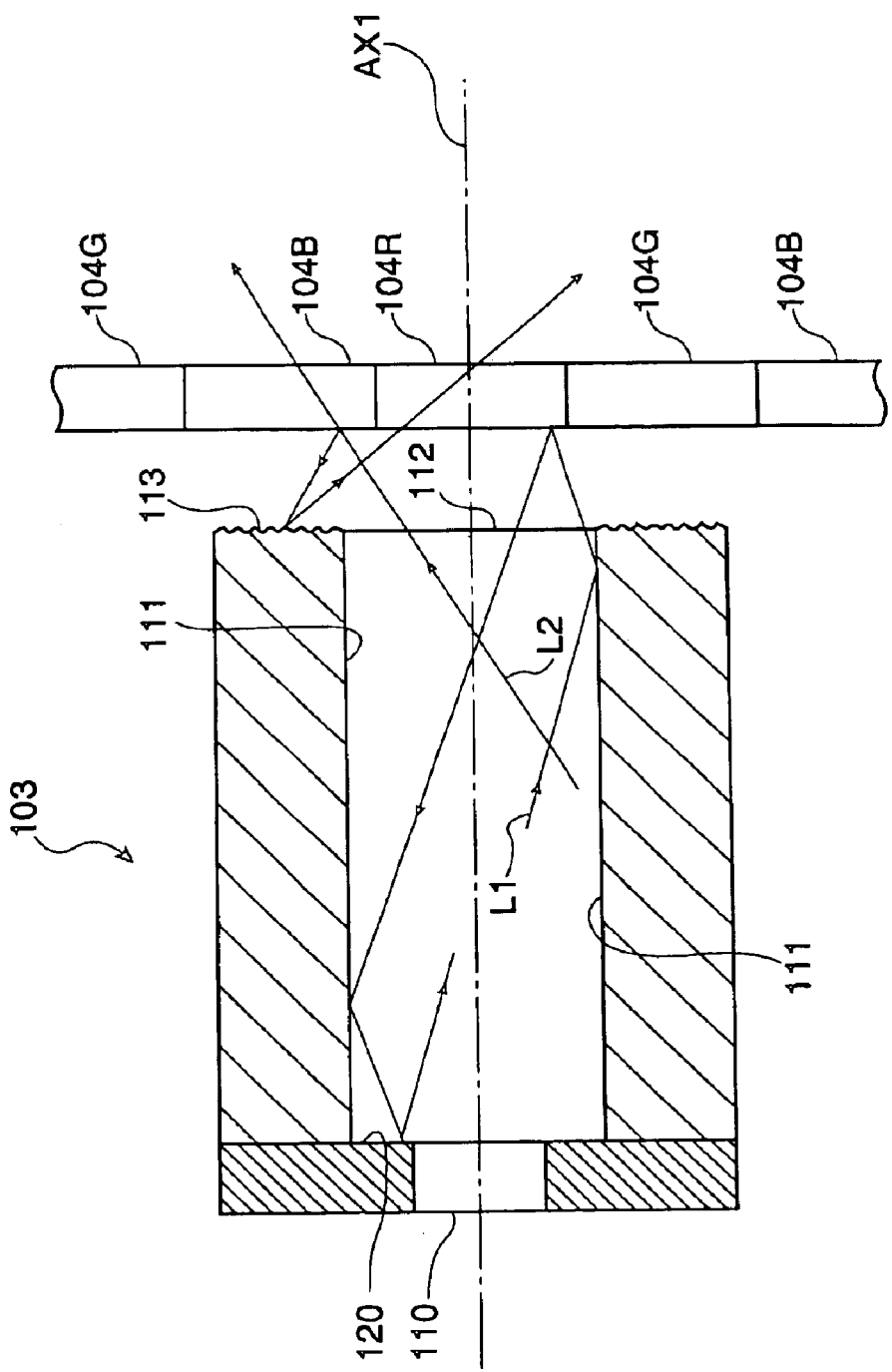
FIG. 2 is a schematic diagram of a rod integrator according to the first embodiment.

FIG. 2 schematically shows the rod integrator 103 in section. The light incident on an incident-end opening 110 from the light source 101 travels while being repeatedly reflected in the reflective inner circumference 111 serving as a reflecting surface. The traveling light emerges from an emerging-end opening 112. It is sufficient that the openings 110 and 112 transmit light. Consider light L1 among the light from the light source 101. The light L1 is incident on an R-light transmitting dichroic film 104R of the color wheel 104. The R-light transmitting dichroic film 104R transmits R light and reflects G light and B light. The G light and the B light reflected by the color wheel 104 are incident on the emerging-end opening 112 of the rod integrator 103.

The light L1 incident on the rod integrator 103 moves inversely toward the light source 101 while being reflected by the inner circumference 111. The light L1 that has moved inversely in the rod integrator 103 is then incident on a reflector 120 provided around the incident-end opening 110. The light L1 incident on the reflector 120 is reflected to move toward the color wheel 104 and emerges from the emerging-end opening 112 of the rod integrator 103. The emerging light L1 passes through the color wheel 104 when being incident on the G-light transmitting dichroic film 104G and the B-light transmitting dichroic film 104B of the rotating color wheel 104. Light that cannot pass through the color wheel 104, but is reflected, repeats the above processes. Accordingly, light-use efficiency can be increased.

Next, consider light L2 of the light from the lightsource 101, the light L2 is incident on the B-light transmitting dichroic film 104B. The B-light transmitting dichroic film 104B transmits B light and reflects R light and G light. The reflected R light and G light are incident on an end face 113 of the outer periphery of the emerging-end opening 112 of the rod integrator 103. The incoming R light and G light are reflected by the end face 113. The reflected R light and G light pass through the color wheel 104 when being incident on the R-light transmitting dichroic film 104R and the G-light transmitting dichroic film 104G of the rotating color wheel 104. The end face 113 can be a scattering surface having the characteristic of reflecting the incident light on the end face 113 toward the optical axis AX1, or the central axis of the rod integrator 103. Therefore, the end face 113 reflects not only the R light and the G light, but also the incident B light, toward the optical axis AX1. The scattering surface is formed such that the end face of the glass rod integrator 103 is formed into a so-called sand surface.

Here, the central axis of the rod integrator 103 represents a linear axis connecting the center of the incident-end opening 110 and the center of the emerging-end opening 112. All embodiments will be described hereinafter, with the optical axis AX1 of the projector 100 agreed with the central axis of the rod integrator 103, in the interest of simplicity.

The end face 113 has a reflecting film having a higher reflectance than that of the coarse surface of the glass member. The reflectance is preferably 80 percent or more. More preferably, forming the reflecting film of aluminum or silver provides a reflectance of 90 percent or more. This allows high light-use efficiency.

The end face 113 is substantially perpendicular to the central axis in agreement with the optical axis AX1. In other words, there may be no need to process the shape of the end face 113 itself such that the end face 113 is diagonally cut with respect to the optical axis AX1 to form an inclined surface. This increases light-use efficiency by processing the end face at low cost by a simple process of forming a reflecting filmon the end face 113.

Figure 3:
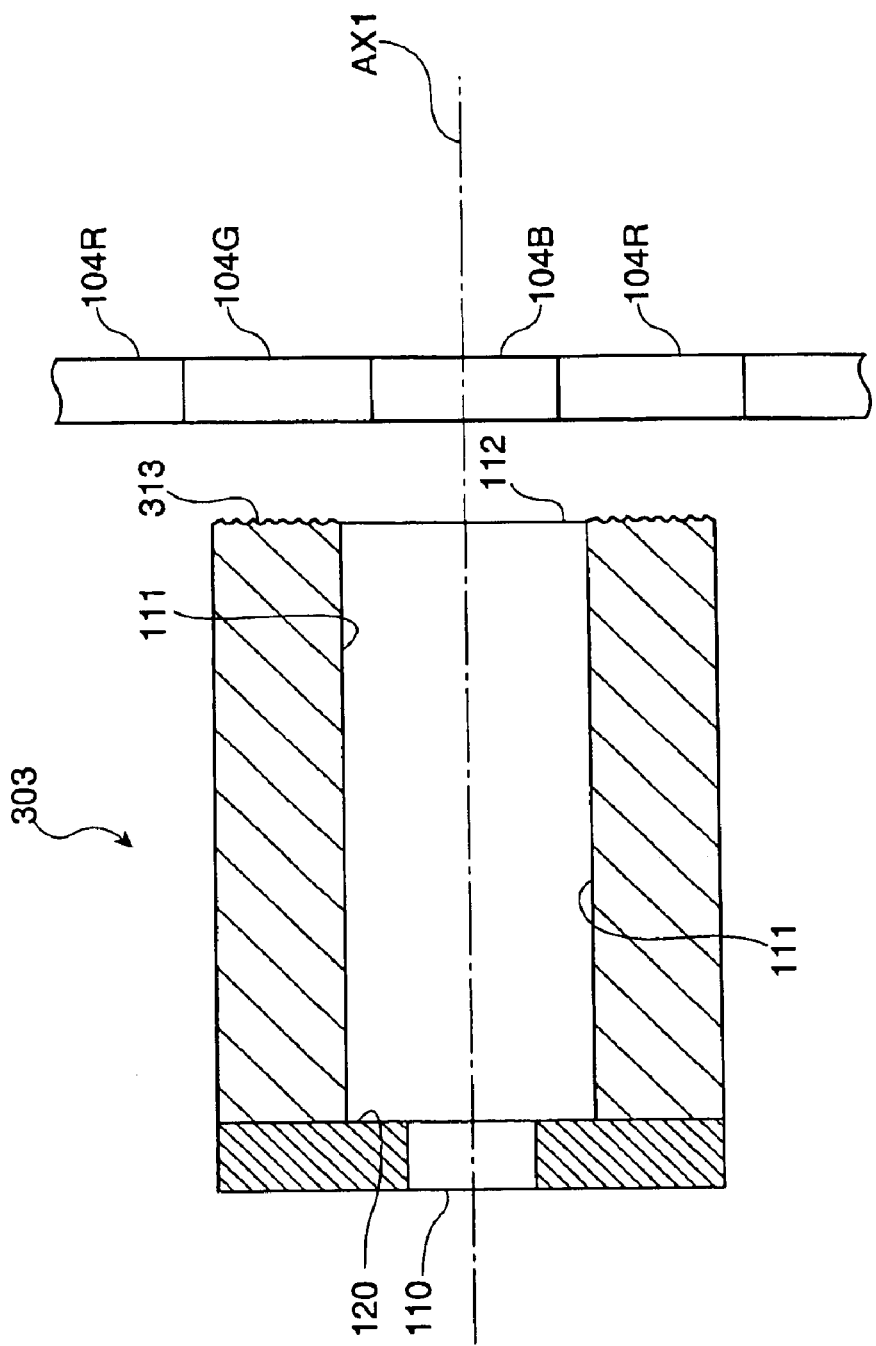
FIG. 3 is a schematic diagram of a rod integrator according to a second embodiment of the invention.

FIG. 3 shows the schematic structure of a rod integrator according to a second embodiment of the invention. The embodiment is different from the first embodiment in that an end face 313 is a blaze surface. The same elements as those of the first embodiment are given the same numerals and a description thereof will be omitted.

Figure 4:
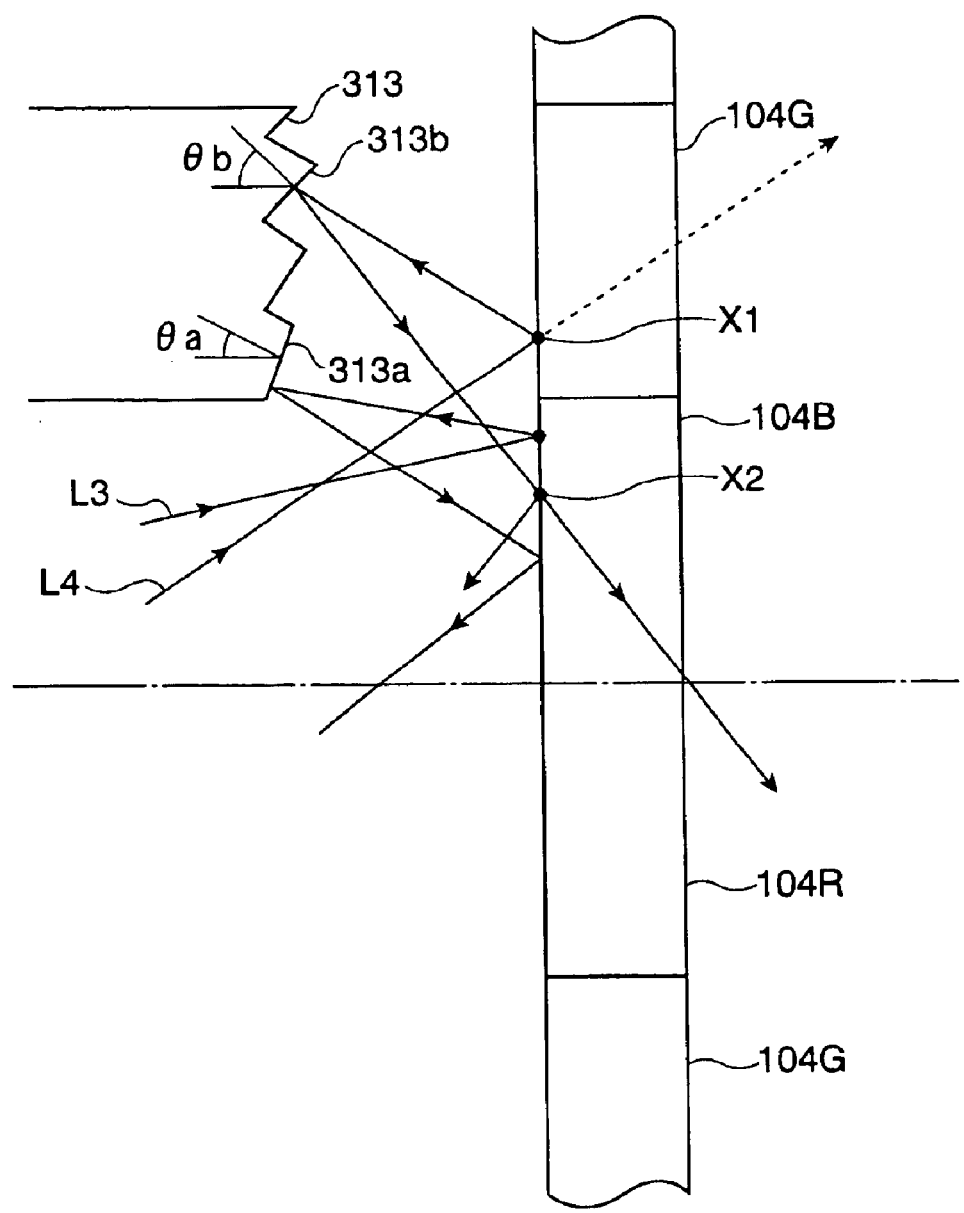
FIG. 4 is an enlarged diagram of the structure adjacent to the end of the rod integrator according to the second embodiment.

FIG. 4 shows the vicinity of the end face 313 in an enlarged scale. FIG. 4 shows only part of the end face 313 above the optical axis AX1 and omits the structure of part lower than the optical axis AX1 for easy understanding. Blaze surfaces 313*a* and 313*b* of the end face 313 have different blaze angles θa and θb depending on the positions of the blaze surfaces 313*a* and 313*b* in the end face 313, the blaze angles θa and θb being defined by the respective normals of the blaze surfaces 313*a* and 313*b* and the optical axis AX1 that is the central axis. The longer the distance between the blaze surfaces 313*a* and 313*b* and the optical axis AX1, or the central axis, is, the larger the blaze angles are. In the case of FIG. 4, the blaze surface 313*b* has a longer distance from the optical axis AX1 than the blaze surface 313*a*. Therefore, the blaze angle θb is larger than the blaze angle θa.

The operation of the embodiment will now be described. Among the light from the light source 101 (not shown), consider light L3 incident on the B-light transmitting dichroic film 104B. Among the light L3, B light passes through the B-light transmitting dichroic film 104B and R light and G light are reflected. The reflected R light and G light are incident on the blaze surface 313*a*. The light L3 incident on the blaze surface 313*a* is reflected toward the optical axis AX1 The reflected light L3 is incident on the B-light transmitting dichroic film 104B again. Since the light L3 is the R light and the G light, it is reflected by the B-light transmitting dichroic film 104B. The reflected light travels in the opposite direction in the rod integrator 303 to be recaptured.

Among the light from the light source 101 (not shown), consider light L4 incident on the G-light transmitting dichroic film 104G. Among the light L4, G light passes through the G-light transmitting dichroic film 104G and R light and B light are reflected. The reflected R light and B light are incident on the blaze surface 313*b*. The blaze surface 313*b* has a longer distance from the optical axis AX1 than the blaze surface 313*a*. Therefore, the blaze angle θb is larger than the blaze angle θa, as described above. Accordingly, the light L4 incident on the blaze surface 313*b* is reflected more toward the optical axis AX1 than the light L3. The reflected light L4 is incident on the B-light transmitting dichroic film 104B. Since the light L4 is the R light and the B light, the B-light component passes through the B-light transmitting dichroic film 104B. The reflected R-light component travels in the opposite direction in the rod integrator 303 to be recaptured.

The light reflected in the position X1 of the color wheel 104 is preferably reflected by the blaze surface 313*b* once and is incident on the position X2 of the color wheel 104 again. The position X2 is closer to the optical axis AX1 than the position X1. Therefore, the light can pass through the color wheel 104 after one reflection by the blaze surface and probability of effectively extracting by the relay lens 105 (see FIG. 1) becomes larger. In this way, setting the blaze angle properly allows the control of the number of reflections until the light emerging from the rod integrator 103 reaches the color wheel 104. Consequently, the light recaptured can be efficiently used. Thus, light-use efficiency can be increased. More preferably, among the blaze surfaces, the surface that does not contribute to the reflection of light has an angle at which the reflected light from the color wheel 104 is not irradiated. This further increases light-use efficiency.

The blaze surface 313 can be formed by etching by a gray-level masking method or an area gray scale method of a photolithography process, a pattern transfer method, a cutting method, or a press working method. The reflecting film can be formed by deposition, spattering, plating and the like. The material of forming the reflecting film may be a dichroic film, aluminum, silver, platinum, gold, titanium, tantalum, nickel, and their alloys and the like.

Figure 5:
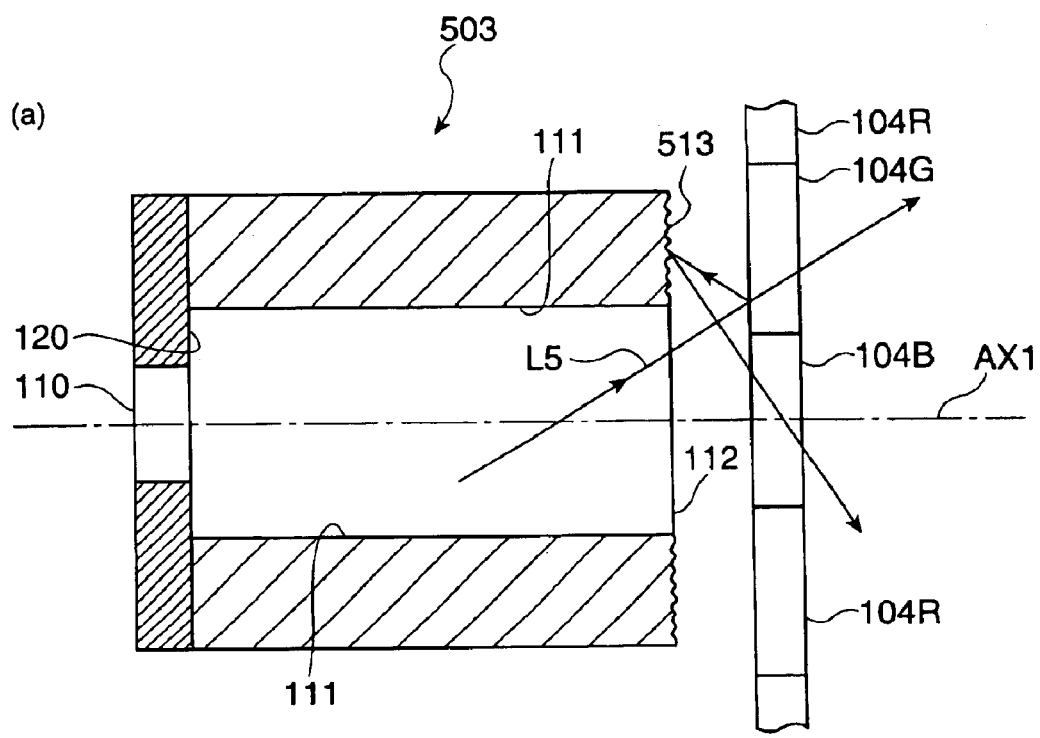
FIGS. 5(a) and 5(b) are schematic diagrams of a rod integrator according to a third embodiment of the invention.
Figure 5:
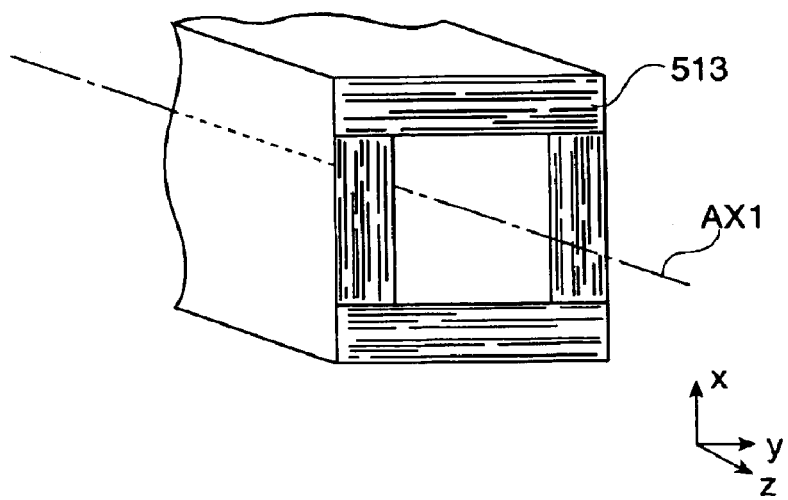

FIG. 5(*a*) shows the schematic structure of a rod integrator 503 according to a third embodiment of the invention. FIG. 5(*b*) shows the rod integrator 503 in perspective, seen from the emerging end. The embodiment is different from the first embodiment in that an end face 513 is a coarse surface, or a texture surface, including a plurality of V grooves having a very small depth. The same elements as those of the first embodiment are given the same numerals and a description thereof will be omitted.

The texture structure of the end face 513 is formed by grinding it in a certain direction with a file, machine working, or press working. The direction of grinding with a file is preferably parallel to the x direction or the y direction in FIG. 5(b). This allows light reflected by the texture surface to be reflected toward the optical axis AX1 The end face 513 is provided with an aluminum or silver reflecting film, as in the above embodiments, to have a reflectance larger than a predetermined value.

Referring again to FIG. 5(a), among the light from the light source 101 (not shown), consider light L5 incident on the G-light transmitting dichroic film 104G. The G-light transmitting dichroic film 104G transmits G light and reflects R light and B light. The reflected R light and B light are incident on the end face 513 at the outer periphery of the emerging-end opening 112 of the rod integrator 503. The end face 513 is a texture surface having the characteristic of reflecting the incident light on the end face 513 toward the optical axis AX1 that agrees with the central axis of the rod integrator 503. The end face 513 has a reflecting film having a predetermined reflectance higher than that of the coarse surface of the glass member, as in the above. This increases light-use efficiency.

Figure 6:
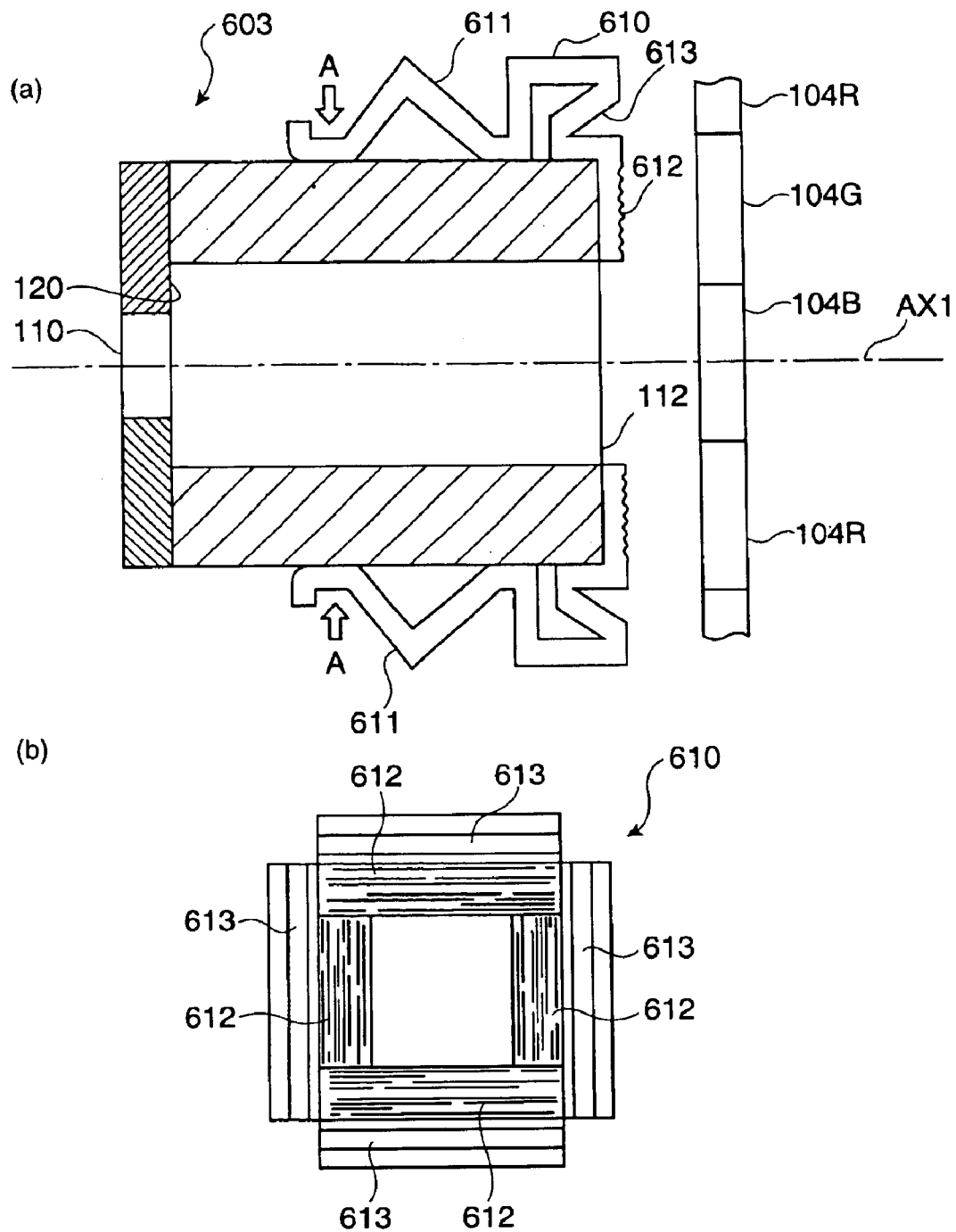
FIGS. 6(a) and 6(b) are schematic diagrams of a rod integrator according to a fourth embodiment of the invention.

FIG. 6(a) shows the schematic structure of a rod integrator 603 according to a fourth embodiment of the invention. The embodiment is different from the above embodiments in that the emerging-end opening 112 of the rod integrator 603 has a frame 610 therearound. The same elements as those of the above embodiments are given the same numerals and a description thereof will be omitted.

The frame 610 has a scattering surface 612 and a reflecting surface 613 including a reflecting film as in the first embodiment. FIG. 6(b) is a diagram of the frame 610 viewed from the emerging end. The frame 610 can include a clip section 611, as shown in FIG. 6(a).

The clip section 611 urges the frame 610 in the direction of arrow A with respect to the rod integrator 603 when the frame 610 is fitted on the rod integrator 603. Thus, the frame 610 can be secured to the rod integrator 603 without an adhesive.

The scattering surface 612 of this embodiment has the same function as that of the first embodiment. Therefore, a description will be omitted here. The scattering surface 612 further has the reflecting surface 613 therearound. The reflecting surface 613 further reflects the light reflected by the color wheel 104. This increases light-use efficiency. The frame 610 can be processed at a very low cost by press working.

Figure 7:
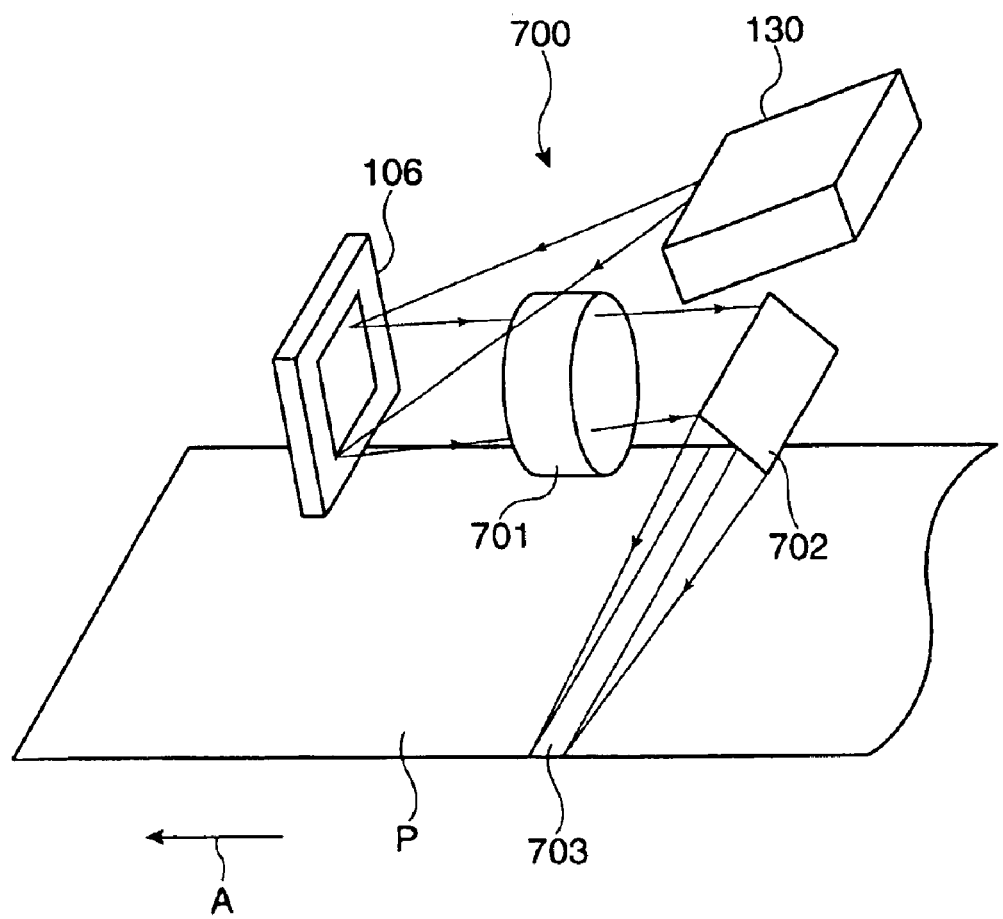
FIG. 7 is a schematic diagram of a printer according to a fifth embodiment of the invention.

FIG. 7 shows the schematic structure of a printer 700 according to a fifth embodiment of the invention. The same elements as those of the first embodiment are given the same numerals and a description will be omitted. The light from the illuminator 130, shown in the first embodiment, is incident on the spatial light modulator 106. The spatial light modulator 106 may be a digital mirror device (DMD).

The light reflected by the spatial light modulator 106 forms an image on photographic paper P by an imaging lens 701. A reflecting mirror 702 for turning the optical path is disposed between the imaging lens 701 and the photographic paper P.

The DMD, or the spatial light modulator 106, is a device in which, for example, micromirrors of 16-μm square are arranged in two dimensions in the form of a substrate at intervals of 1 μm, for controlling the on/off of the respective areas of the micromirrors by controlling the rotation of the micromirrors. With this embodiment, the micromirrors of the spatial light modulator 106 can be controlled so that light that has passed through a color filter (not shown) in the illuminator 130 is reflected toward the imaging lens 701, so that the respective micro-domains on the photographic paper P of the micromirrors are exposed.

On the other hand, controlling the micromirrors of the spatial light modulator 106 so that the light that has passed through the color filter (not shown) is reflected toward other direction than that of the imaging lens 701 prevents the micro-domains on the photographic paper P of the micromirrors from being exposed. The controlling for each micromirror allows a dot image to be exposed to a predetermined area 703 on the photographic paper P (a latent image is formed).

The spatial light modulator 106 has the micromirrors arranged in two dimensions so as to simultaneously expose a plurality of scanning lines perpendicular to the direction to carry the photographic paper P, for example, constructed as a mirror array of 192 scanning lines. The color filter (not shown) of the illuminator 130 is, for example, shaped like a disc divided into R, G, and B filters at every 120 degrees and is rotated at a constant speed. R, G, and B light are therefore sequentially incident on the spatial light modulator 106 at regular intervals. The photographic paper P is continuously carried in the direction of arrow A. The spatial light modulator 106 reflects the R, G, and B light irradiated in time sequence onto the photographic paper P so as to form a color image for exposure. This provides a full-color image on the photographic paper P. The details of the operation of the printer of the type of exposing photographic paper are described in, for example, JP-A-2001-133895.

Although the optical device according to the invention has been described with a printer that exposes photographic paper as an example, it should be understood that it is not limited to the printer. The invention can be easily applied to any optical devices that need illumination light with a bright uniform illumination distribution. For example, the invention can be effectively applied to semiconductor aligners and so on.

The reflecting surface of the above embodiments, which is a scattering surface or a blaze surface, can be formed by the following way: for example, a planar member of about 50 μm to 300 μm in thickness is processed into a scattering surface, a texture surface, or a blaze surface. The planer member is then secured to the emerging end face of the rod integrator.

Figure 8:
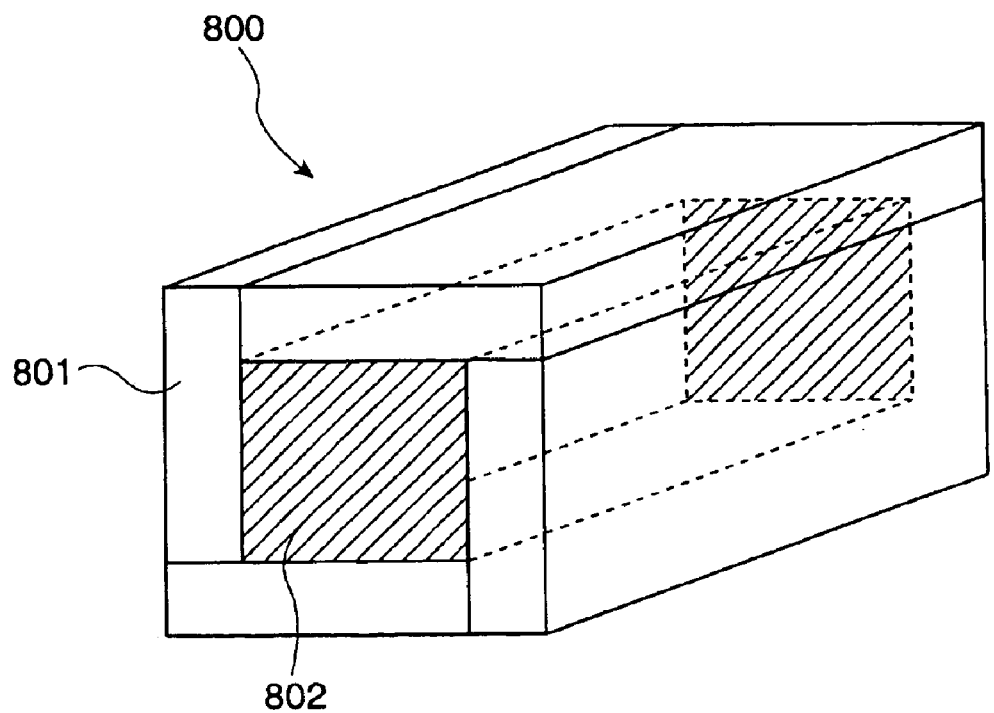
FIG. 8 is a schematic diagram of a solid-state rod integrator.

The rod integrator may be a solid-state rod integrator 800, shown in FIG. 8. The solid-state rod integrator has an optical waveguide that is not hollow but filled with a specific optical material 802. In general, glass (berkelium 7, quartz and the like) is used as the optical material 802. When a single-wavelength semiconductor light source can be used as a light source, the optical material 802 may be a plastic material (epoxy, acryl and so on), ignoring heat resistance. The center portion of the solid-state rod integrator 800 can be filled with the optical material 802 with a higher refractive index than that of a peripheral wall 801. The light incident on the solid-state rod integrator 800 is reflected under the conditions of total internal reflection (TIR conditions) to generate on the interface between a high refractive element and a low refractive element. This provides a reflectance of about hundred percent on the interface. Therefore, light-transmission efficiency is increased as compared with the hollow rod integrator.

What is claimed is:

1. A rod integrator with a color wheel, comprising:
    the rod integrator including an incident-end opening and an emerging-end opening, the rod integrator further including a reflecting surface, for emitting light that is incident on an incident-end opening from a light source through an emerging-end opening, an end surface of an outer periphery of the emerging-end opening, which is on a plane that is substantially perpendicular to a central axis of the rod integrator and being a scattering surface or a blaze surface that reflects the incident light from the color wheel on the end surface toward the central axis of the rod integrator.

2. The rod integrator according to claim 1, the blaze surface of the end surface having different blaze angles depending on a position of the blaze surface in the end surface, the blaze angle being defined by a normal of the blaze surface and the central axis, the longer a distance between the blaze surface and the central axis is, the larger the blaze angle is.

3. The rod integrator according to claim 1, a reflectance of the end surface being approximately 80 percent or more.

4. The rod integrator according to claim 1, the scattering surface of the end surface including a plurality of V-grooves having a very small depth.

5. The rod integrator according to claim 1, the end surface further having a reflecting surface around the scattering surface.

6. An illuminator, comprising:

a light source that supplies light; and the rod integrator according to claim 1, that substantially uniformizes an intensity distribution of the light from the light source.

7. A projector, comprising:

the illuminator according to claim 6;

a spatial light modulator that modulates incident light in accordance with an image signal; and a projector lens that projects the modulated light.

8. An optical device, comprising:

the rod integrator according to claim 1; and a light source that supplies light.

* * * * *